Patented May 10, 1932

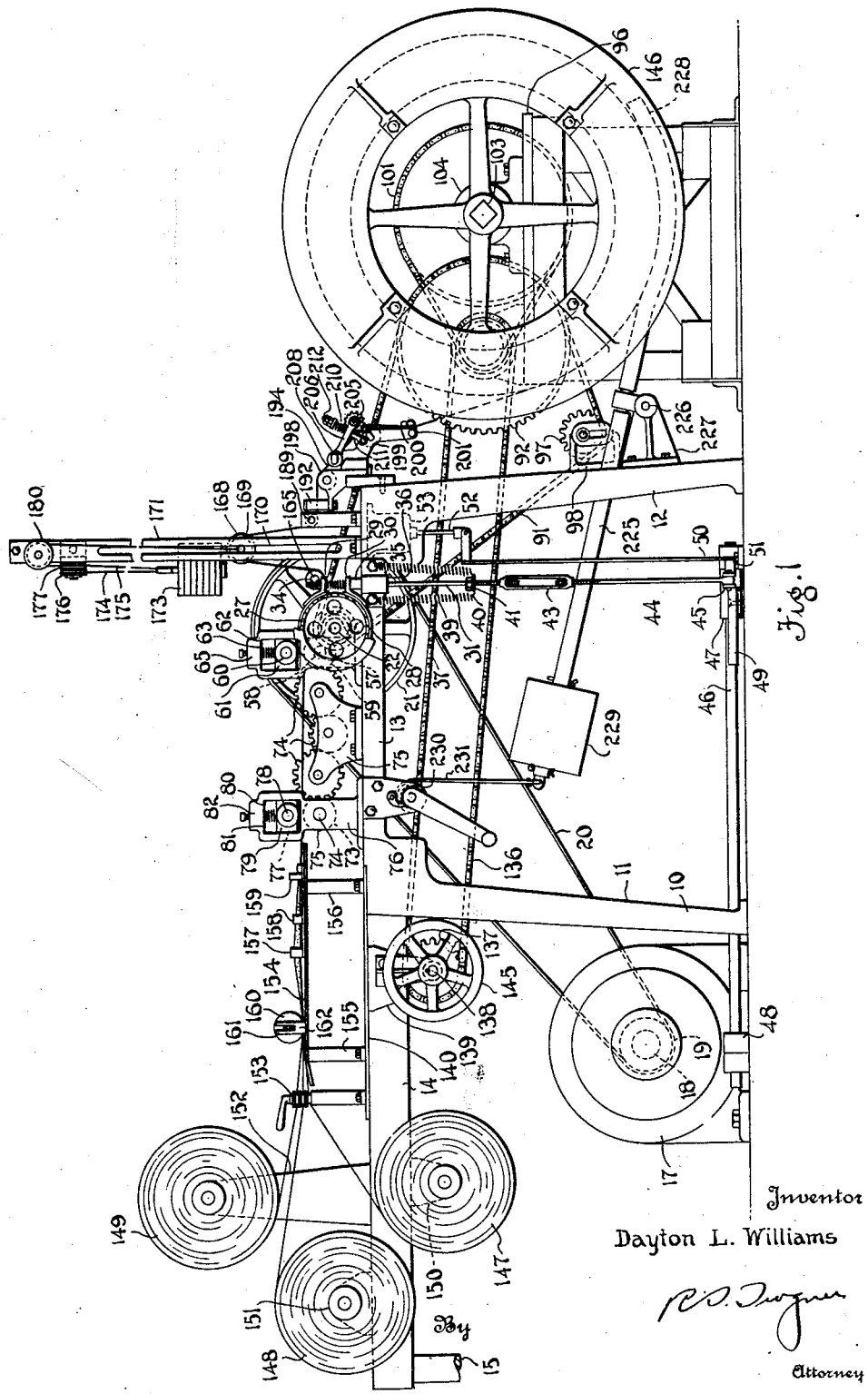

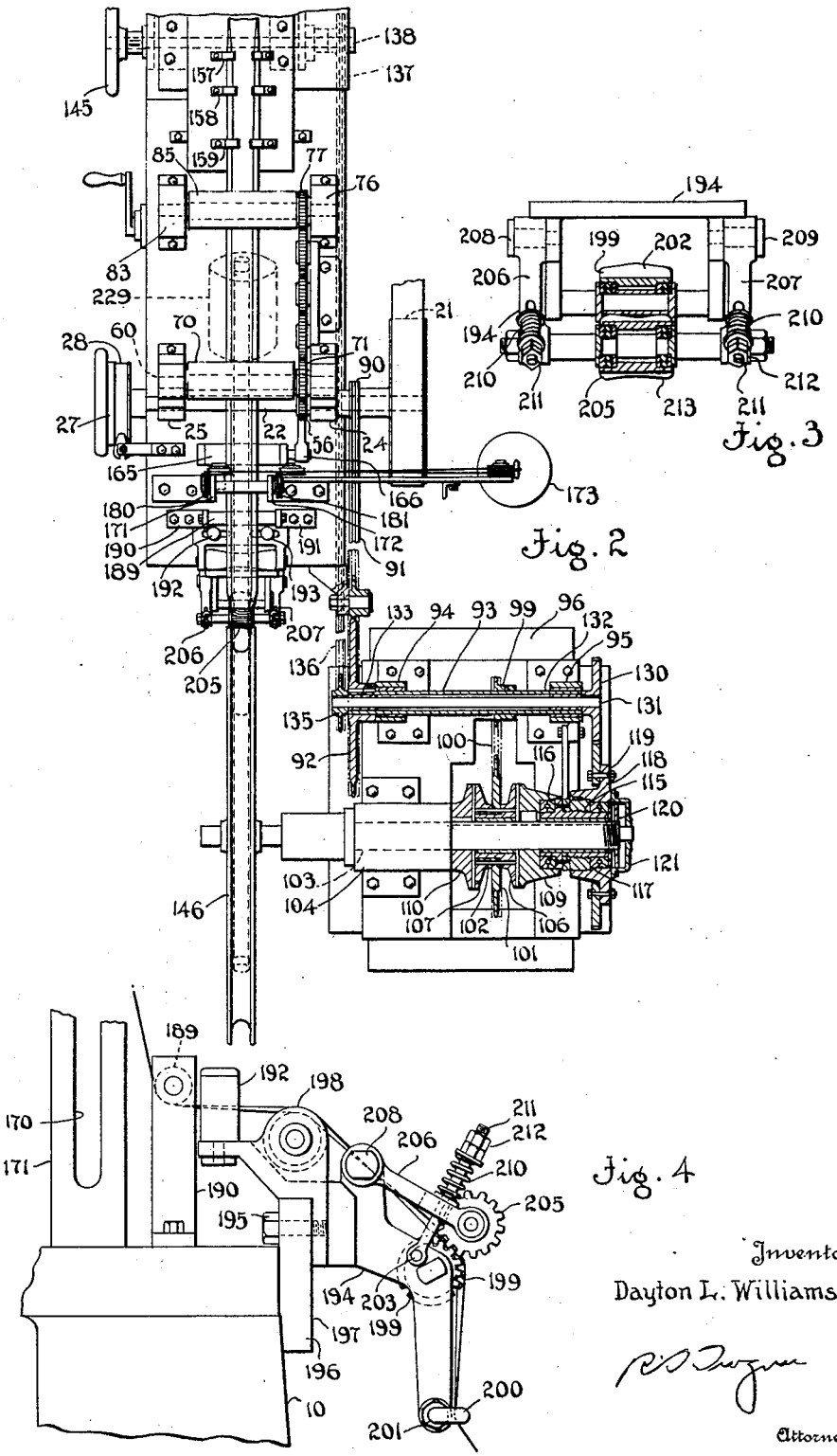

1,857,994

UNITED STATES PATENT OFFICE

DAYTON L. WILLIAMS, OF AKRON, OHIO, ASSIGNOR TO THE GOODYEAR TIRE & RUBBER COMPANY, OF AKRON, OHIO, A CORPORATION OF OHIO

MACHINE FOR AND METHOD OF BUILDING PNEUMATIC TIRE FLAPS

Application filed October 18, 1929. Serial No. 400,516.

This invention relates to flaps for pneumatic tires, and it has particular relation to a machine for and a method of manufacturing such articles.

An object of the invention is to provide a machine for assembling strips of rubber and fabric, and so manipulating the resulting unit that it will readily conform to the shape of a flap as positioned between the beads of a pneumatic tire casing.

Another object of the invention is to provide a method of and machine for so manipulating fabric material in the manufacture of flaps for pneumatic tires that the finished flaps will be free from wrinkles and other irregularities of form.

Flaps for pneumatic tires are trough-shape in cross-section and, owing to this fact and the fact that the flap is an annular article, the fabric material in the base of the flap has a diameter different from that of the fabric at the sides of the trough. Hence, it is important that the flap be pre-formed before its use in conjunction with a pneumatic tire, and for this reason the manufacture of tire flaps is much more difficult than if it were not necessary to have the flaps of trough shape in cross-section.

Heretofore, it has been the practice to assemble several layers of rubber and rubberized fabric with a relatively wide layer of felted fabric, and thereafter wind the unit thus formed upon a cylindrical drum in such manner that a convolute roll of flap material was provided. No pre-forming of the flap material was effected during these operations and instead the forming of the flap material into a trough-shape cross-section was effected during the vulcanization thereof. In the latter operation the flap material was wound in the grooves of a spirally grooved drum under such tension that the material assumed the shape of the groove. Frequently, wrinkles were formed in the material during this winding operation, and the final product correspondingly was defective.

The present invention provides a more efficient method of pre-forming flap material into trough-shape which practically eliminates the formation of wrinkles in the finished product. This is effected by passing the flap material between a pair of rollers, one of which has a convex surface, and the other a concave surface. These rollers have teeth which have convex edges and concave edges, respectively. During the passage of the flap material between the rollers the former is retained under sufficient tension to insure crimping of the material by the teeth on such rollers. The rollers preferably are of such length that the crimping section is confined to substantially the central portion of the flap material which usually is made largely of rubberized fabric, while the outer edge portions of the material which usually are made largely of felted fabric are not crimped. One reason for so crimping the flap material is that the central portions of the flap have a greater tensile strength than the edge portions and can better withstand the crimping action.

The crimping of the central portion of the flap material, which also is that part of the material comprising the base of the trough-shaped finished flap, practically obviates the formation of wrinkles during the subsequent winding of the flap upon grooved drums. It is evident that if these crimps are provided every half-inch for example, it is difficult to form any large wrinkle, because any wrinkling during the final shaping thereof into trough form will be proportioned throughout the length of the material. In other words, the crimping of the material insures the distribution of the excess material which tends to wrinkle throughout the length of the material.

For a better understanding of the invention, reference may now be had to the accompanying drawings, in which:

Fig. 1 is a side elevational view of a machine for building flaps for pneumatic tires constructed according to one embodiment of the invention;

Fig. 2 is a fragmentary plan view of the construction illustrated by Fig. 1; and Figs. 3 and 4 are detail views on a larger scale, illustrating particularly the mechanism employed for crimping the material of which the flaps are built.

As best shown by Fig. 1, a frame 10 is provided comprising spaced uprights 11 and 12 supporting at their upper ends a table 13. An angle bar 14 projects from one end of the table 13 and is supported at its end remote with respect to the table by a third upright 15. Adjacent the base of the upright 11, a motor 17 is mounted which is provided with a shaft 18 having a pulley 19 rigidly secured thereon. A belt 20, trained about the pulley 19, also is trained about a relatively large pulley 21 which is secured to a shaft 22 journaled in bearings 24 and 25 (Fig. 2) mounted upon the table 13. The end of the shaft 22 opposite the end to which the pulley 21 is secured is provided with a brake drum 27 about which a split brake band 28 is applied. The ends of the latter have spaced apertured lugs 29 and 30 through which a vertically disposed rod 31 slidably extends. The upper end of the rod has a nut 34 threaded thereon which is adapted to abut the lug 29 while beneath the lug 30 the rod extends through a sleeve 35 and a bearing 36 secured by bolts 37 to the table 13.

Normally the rod 31 is urged upwardly and hence, the nut 34 away from the lug 29 by springs 39 secured to an apertured plate 40 through which the rod 31 extends and to the bolts 37 securing the bearings 36 to the table. The plate 40 is adjustably positioned on the rod 31 by a nut 41 threaded on the latter. The lower end of the rod 31 is connected by a turn buckle 43 to a second rod 44 which, at its lower end, is pivotally secured to an arm 45. This arm in turn is rigidly secured to a shaft 46 journaled in bearings 47 and 48 secured to the floor. A treadle 49, secured to the shaft 46, provides a means for moving the rods 31 and 44 downwardly against the action of the springs 39 in order to clamp the brake band 28 about the brake drum 27 and thus prevent rotation of the shaft 22 following deenergization of the motor 17. Deenergization of the motor is effected simultaneously with the application of the brake by means of a rod 50 pivotally secured at its lower end to an arm 51 which in turn is secured to the shaft 46. The upper end of the rod 50 is secured to a rod 52 which is operatively associated with an electrical switch 53 adapted to make and break the circuit in which the motor is arranged. Hence, the foot treadle 49 is depressed, the circuit of the motor is broken by downward movement of the rods 50 and 52 and simultaneously the brake 28 is applied to the brake drum 27.

The shaft 22 also is provided with a pinion 56 (Fig. 2) rigidly secured thereto which in turn meshes with a pinion 57 (Fig. 1) rigidly mounted on a shaft 58 disposed parallel to the shaft 22 and journaled in the same bearing brackets 24 and 25 in spaced relation to the latter shaft. Intermediate its ends, the shaft 58 is provided with a roller 59 which is so secured to the shaft that it rotates therewith. Above the shaft 58, a third shaft 60 is journaled in blocks 61 which are slidably mounted in guideways 62 forming part of the bearing brackets 24 and 25. Normally the blocks 61 are urged downwardly by springs 63 disposed in the guideways between the blocks 61 and horizontal portions 65 of the brackets 24 and 25 at the upper end of the guideways. The shaft 60 intermediate its ends is provided with a roller 70 rigidly secured thereto while adjacent the bearing bracket 24 it is provided with a pinion 71 which meshes with the pinion 56 on the shaft 58.

Rotary motion of the pinion 57 also is transmitted to a pinion 73 through a train of gears 74 which are journaled in a bracket 75 secured to the table 13. The pinion 73 is rigidly secured to a shaft 74, the ends of which are journaled in bearing brackets 76 and 83 also secured to the table 13. Between its ends the shaft 74 is provided with a roller 75 rigidly secured thereto. The pinion 73 also meshes with a pinion 77 rigidly secured to a shaft 78 journaled in blocks 79 which are slidably mounted in guideways 80 formed in the upper portions of the bearing brackets 76 and 83. Springs 81 abutting the blocks at one end and horizontal portions 82 of the bearing brackets at their other ends normally retain the blocks 79 in their lowermost positions. The shaft 78 intermediate its ends also is provided with a roller 85.

The shaft 22 also is provided with a sprocket wheel 90 (Fig. 2) rigidly secured thereto and about which a chain 91 is trained. Also the chain 91 is trained about a relatively large sprocket wheel 92 which is keyed to one end of a sleeve 93 that is journaled in bearing brackets 94 and 95 secured to the upper surface of a table 96. This table is supported by a frame work 98 located adjacent the frame 10. The chain 91 also is trained about an idler sprocket wheel 97 which is adjustably mounted in a bracket 98 secured to the upright 12 of the frame 10. A sprocket wheel 99 is rigidly secured to the sleeve 93 intermediate the ends of the latter, and a chain 100 trained about it also is trained about a sprocket wheel 101 which is secured to a sleeve 102 mounted on a shaft 103. The latter shaft is journaled in a bearing bracket 104 rigidly secured to the table 96. Opposite ends of the sleeve 102 are provided with clutching faces 106 and 107 which are adapted to coact with clutching members 109 and 110 splined to the shaft 103. The sleeve 102 is rotatable with respect to the shaft 103 and is also slidably mounted longitudinally thereof and hence the sleeve and the clutch members 109 and 110 may simultaneously be moved longitudinally of the shaft 103. Normally the clutch member 110 abuts the bearing bracket 104 and hence, upon movement of the clutch member 109 toward the sleeve 102 and the clutch member 110, the clutching faces 106 and 107 on the sleeve 102 may be made to have greater frictional engagement with the clutching members 109 and 110.

A sleeve 115 is journaled on the shaft 103 adjacent the clutch member 109 and is separated from such clutching member by a thrust bearing 116. This sleeve, intermediate its ends, is provided with a threaded portion 117 upon which a gear 118 having an internally threaded flange 119 is threaded. The gear 118 is retained on the shaft 103 by a nut 120 engaging a threaded end of the shaft and a thrust bearing 121 which in turn engages the threaded flange 119 on the sprocket wheel. When the gear 118 is rotated relative movement of the gear and the threaded sleeve 115 longitudinally of the shaft 103 will occur and by reason of the fact that the gear is prevented from moving axially in one direction by the nut 120 on the shaft 103, the sleeve 115 will be moved longitudinally of the shaft in a direction toward the clutching member 109 when the gear is so turned that movement of the sleeve 115 and the gear results in their remote ends becoming spaced a greater distance. Such movement of the sleeve 115 in turn causes a greater frictional engagement of the clutching members 109 and 110 with the clutching faces 106 and 107 of the sleeve 102 and hence, a more positive connection of the sleeve with the shaft 103. Thus, slippage of the shaft 103 with respect to the sleeve 102 may be regulated.

Rotation of the gear 118 is effected by its engagement with a gear 130 rigidly secured to a shaft 131 which extends through the sleeve 93 and is journaled in smaller sleeves 132 and 133 disposed within such sleeve. The opposite end of the shaft 131 is rigidly secured to a sprocket wheel 135 about which a chain 136 is trained. This chain in turn is trained about a sprocket wheel 137 which is rigidly secured to a shaft 138, journaled in bearing brackets 139. The latter are secured to a plate 140 which is rigidly secured to the table 13 and the frame member 14 projecting from one end thereof. The end of the shaft 138 opposite that to which the sprocket wheel 137 is secured is provided with a hand wheel 145 for facilitating turning of the shaft and consequently adjustment of the clutching member 109 with respect to the sleeve 102.

That end of the shaft 103 remote with respect to the end having the nut 120 thereon is polygonal in cross-section in order that a grooved drum 146 having a polygonal opening therein may be so mounted on the shaft that it will rotate therewith. This drum is employed for winding flap material in the groove therein.

The material from which flaps are to be manufactured is provided in rolls and, as shown by Fig. 1, three rolls 147, 148 and 149 of material are provided. The roll 147 comprises a relatively wide felted fabric material while the rolls 148 and 149 respectively are formed of rubber and rubberized fabric. The roll 147 is mounted in a bearing bracket 150 secured to the frame member 14 and projecting below such frame member while the rolls 148 and 149 are journalled in bearings 151 and 152 projecting above the frame member 14 different distances. In the finished flap the edges of the felted fabric are folded over and above the edges of the rubber and rubberized fabric. In assembling the three strips of flap material they are directed through a guiding device 153 and thence upon a plate 154 supported by brackets 155 and 156 which are secured to the plate 140. Then the strips are conducted beneath a roller 160, which is secured to a shaft 161, the ends of which are free to move vertically in a slotted bracket 162, mounted on the plate 154. The roller 160 by reason of its gravitational action compresses the three strips of fabric into a unitary assembly after which the assembly is conducted between progressively folding members 157, 158 and 159 which fold the edges of the felted fabric over the edges of the rubber and rubberized fabric. Following this folding action, the assembly is conducted between the rollers 75 and 77 which firmly stitch the three strips of material together because of the fact that the roller 77 is pressed downwardly by the springs 81. The assembly also is conducted between the rollers 59 and 70 which further stitch the strips together.

Following this movement of the flap material, it is conducted beneath a roller 165 which is journaled in a bearing bracket 166 secured to the table 13 and then over a floating roller 168. The latter roller is provided with a shaft 169, the ends of which are free to move in vertically disposed elongate slots 170 provided in a pair of vertically disposed bars 171 and 172. Normally, the roller 168 is urged upwardly by an adjustable counterweight 173, which has secured thereto a pair of cables 174 and 175. These cables are trained over a pair of sheaves 176 and 177 respectively secured to the bar 172 adjacent the upper end thereof and then respectively over sheaves 180 and 181 secured respectively to the upper ends of the bars 171 and 172. In turn the cables 174 and 175 are secured to the ends of the shaft 169.

From the roller 168, the flap material is conducted under a roller 189 journaled in brackets 190 and 191 secured to the table 13 and then between a pair of vertically disposed rollers 192 and 193 which are journaled in a bracket 194. This bracket (Fig. 4) is secured by bolts 195 to a plate 196 and the plate in turn is secured by screws 197 to the frame 10. Then the flap material is conducted over a roller 198 journaled in the bracket 194 and then over a roller 199 and under a guide bar 200 secured by a bolt 201 to the bracket 194. Then the flap material is conducted to the drum 146 and is wound in the groove thereof. The roller 199 is of convex formation, as shown best by Fig. 3, and is provided with teeth 202, the outer surfaces of which are convexed longitudinally. Preferably, the radius of curvature of the convex surfaces on the teeth increases gradually from the intermediate portions thereof toward the ends thereof. A roller 205 adapted to cooperate with the roller 199 is mounted in the free ends of a pair of arms 206 and 207, which at their opposite ends, are pivoted to pins 208 and 209 that are in turn secured to the bearing bracket 194. The arms 206 and 207 are resiliently pressed downwardly by springs 210, each of which encircles an eye bolt 211 pivotally secured to the bracket 194 as indicated at 203, and which projects through the arms 206 and 207 respectively. The springs abut the arms 206 and 207 at one end and at their opposite ends, nuts 212 threaded upon the outer ends of the eye bolts. As best shown by Fig. 3, the roller 205 is provided with teeth 213, the outer edges of which are of concave formation. These teeth are so shaped that the radius of curvature of their concave surfaces gradually increases from a central portion toward their ends.

In order further to insure winding of the flap material in the groove of the drum 146 without wrinkles, a bar 225 is provided which is pivoted, as indicated at 226, to a bracket 227 secured to the upright 12. One end of this bar is provided with an arcuate portion 228 normally disposed in the groove of the drum 146 and pressing against the flap material wound therein. The opposite end of the bar is provided with a counterweight 229. In order to raise the counterweighted end of the bar 225, when it is desired to move the bracket 227 from the shaft 203, a winch 230 is provided and a cable 231 secured to the winch also is secured to the end of the arm.

In operation of the above described mechanism, when the motor 170 is energized and the strips of flap material are conducted through the guiding device 153, under the roller 160 and between the folding devices 157, 158 and 159, the strips are secured together by reason of the rubber incorporated therein and the edges of the felted fabric are folded over the edges of the rubber and rubberized fabric. It is apparent also that the rollers 75 and 77 and the rollers 59 and 70 firmly stitch these strips together. By reason of the counterweight 173 which tends to raise the roller 168 over which the material is conducted, a variable tension may be applied to the flap material. After being conducted over the roller 168 which applies tension to the flap material, the latter, in moving between the rollers 205 and 199, is crimped by reason of the cooperation of the concave teeth 213 and the convex teeth 202 on such rollers. This crimping action may be varied by adjusting the tension of the spring 210 by means of the nuts 212 on the eye bolts 211. The crimping action of the rollers 199 and 205 creases the flap material approximately every one-half inch and simultaneously partially preforms the flap material to trough shape. Following this crimping action of the flap material, its conduction into the groove of the drum 146 results in its assuming the shape of the groove. While formation of the flap material into trough-shape causes a variation of the diameters of the material in the flap when wound into annular forms as upon the drum, wrinkling or buckling of the material in that portion of the trough having the lesser diameter or that portion comprising the base of the trough is prevented from accumulating over a large portion of the flap by the crimping action of the rollers 199 and 205. It is possible that slight excesses of material may occur between each pair of crimps, but the wrinkles that would result therefrom are negligible and are not noticeable, whereas if these wrinkles were allowed to accumulate over a large length of the material, a large wrinkle would occur and result in the flap material being defective. Any slight wrinkle that may occur between crimps is effectively smoothed out by action of the arcuate portion 228 of the bar 225 which is disposed in the groove of the drum 146. Actual operation of this machine has proved that wrinkling in flap material is practically obviated by its use.

From the foregoing description, it is apparent that a machine and method for building flaps has been provided by means of which wrinkling or buckling of such character as to result in defective flaps is obviated. Moreover, it is apparent that the flaps are wound upon a grooved drum approximately in the shape that they are finally to be used in conjunction with pneumatic tires. Thus, the vulcanizing operation later applied to the flap material does not form the flap material to trough shape although it does retain the flap material in such shape during its vulcanization.

Although I have illustrated but the preferred form of the invention and have described that form in detail, it will be apparent to those skilled in the art that the invention is not so limited but that various modifications may be made therein without departing from the spirit of the invention or from the scope of the appended claims.

What I claim is:

1. The combination with a machine for building flaps for pneumatic tires, of a pair of complementary rollers between which the flap material passes, one of the rollers having a convex contour, and the other roller having a concave contour, said rollers having intermeshing teeth.

2. The combination with a machine for building flaps for pneumatic tires, of a pair of complementary rollers between which the flap material passes, one of the rollers having a convex contour, and the other roller having a concave contour, said rollers having an axial length less than the width of the flap material, said rollers also having intermeshing teeth.

3. The combination with a machine for building flaps for pneumatic tires, of a pair of complementary rollers between which the flap material passes, one of the rollers having a convex contour, and the other roller having a concave contour, said rollers having intermeshing teeth, a grooved drum for winding the flap material after it has passed between the rolls, and means for driving the drum.

4. The combination with a machine for building flaps for pneumatic tires, of a pair of complementary rollers between which the flap material passes, one of the rollers having a convex contour, said rollers having intermeshing teeth.

5. The combination with a machine for building flaps for pneumatic tires, of a pair of complementary rollers between which the flap material passes, one of the rollers having a concave contour, said rollers having intermeshing teeth.

6. The combination with a machine for building flaps for pneumatic tires, of a pair of complementary rollers between which the flap material passes, one of the rollers having a longitudinally arcuate contour, said rollers having an axial length less than the width of the flap material, each roller having teeth on its peripheral surface, a grooved drum for winding the flap material after it has passed between the rollers, and means for driving the drum including an adjustable friction clutch device for changing the speed of rotation of the drum as the roll of flap material on the drum increases in radius.

7. The method of manufacturing flap material which comprises assembling a plurality of strips of fabric in superposed relation, shaping the strips into arcuate form transversely thereof, and crimping the assembled strips while they are in arcuate form.

8. The method of manufacturing flap material which comprises assembling a plurality of strips of fabric in superposed relation, shaping the strips into arcuate form transversely thereof, and crimping the arcuate strips in such manner that the radius of curvature of the arc progressively increases from the center of the strip material toward the edges thereof.

9. The method of manufacturing flap material which comprises assembling a plurality of strips of flap material in superposed relation, and crimping the assembled strips the crimping action being progressively increased from a point centrally of their edges in directions toward said edges.

10. A device for preforming a strip of flexible material comprising intermeshing, toothed rollers, one of which is arcuate longitudinally in a convex manner and the other of which is arcuate longitudinally in a concave manner.

In witness whereof, I have hereunto signed my name.

Signed at Akron, in the county of Summit and State of Ohio, U. S. A., this 17th day of October, 1929.

DAYTON L. WILLIAMS.